(12) United States Patent
Takagi (10) Patent No.: US 8,497,643 B2
(45) Date of Patent: Jul. 30, 2013

(54) LINEAR SCALE, LINEAR MOTOR, AND LINEAR MOTOR CONTROLLER

(75) Inventor: Katsuyuki Takagi, Shizuoka (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 484 days.

(21) Appl. No.: 12/905,181

(22) Filed: Oct. 15, 2010

(65) Prior Publication Data

US 2011/0109252 A1   May 12, 2011

(30) Foreign Application Priority Data

Nov. 9, 2009   (JP) ................................ 2009-256042

(51) Int. Cl.
*H02P 7/00* (2006.01)

(52) U.S. Cl.
USPC ............ 318/135; 318/286; 318/437; 318/467

(58) Field of Classification Search
USPC ................. 318/135, 282, 286, 437, 466, 467, 318/687; 324/207.13, 207.23, 207.24, 259
See application file for complete search history.

(56) References Cited

U.S. PATENT DOCUMENTS

| | | | | |
|---|---|---|---|---|
| 3,763,412 A | * | 10/1973 | Detrick et al. | 318/135 |
| 3,829,746 A | * | 8/1974 | Van et al. | 318/135 |
| 3,857,075 A | * | 12/1974 | Sawyer | 318/38 |
| 3,895,281 A | * | 7/1975 | Corbaz | 318/687 |
| 7,830,109 B2 | * | 11/2010 | Sasaki et al. | 318/687 |
| 7,965,074 B2 | * | 6/2011 | Nakagawa et al. | 324/207.21 |

FOREIGN PATENT DOCUMENTS

JP   2005-143171 A   6/2005

* cited by examiner

*Primary Examiner* — Eduardo Colon Santana
*Assistant Examiner* — Thai Dinh
(74) *Attorney, Agent, or Firm* — Studebaker & Brackett PC (57) ABSTRACT

Disclosed is a linear scale for obtaining a distance from a reference point. A scale detection mechanism is adapted to output waveform signals of the same phase. Also the scale detection mechanism corresponds to a magnetic flux density generated by magnetic bodies of a scale element. The scale detection mechanism may be sensors. The sensors are arranged at even intervals corresponding to a scale length of the scale element. The sensors are adapted to output sine-wave signals having the same phase to continuously detect the scale element in a movement direction of the scale element. The scale element has opposite ends each has the same polarity and configured such that an output voltage of the single sensor detecting the end of the scale element is reduced to one-half of an output voltage of the single sensor detecting the remaining portion of the scale element.

6 Claims, 10 Drawing Sheets

LINEAR SCALE, LINEAR MOTOR, AND LINEAR MOTOR CONTROLLER

BACKGROUND OF THE INVENTION

1. Field of the Invention

The present invention relates to a linear scale, a linear motor, and a linear motor controller.

2. Description of the Related Art

A semiconductor production apparatus or other similar type of apparatus is equipped with an elongate moving-magnet type linear motor for conveyance.

The moving-magnet type linear motor is provided with a base frame adapted to set a given linear movement direction, an armature mounted to the base frame, a rail laid along the movement direction, a movable section mounted to the rail in a reciprocating manner along the movement direction relative to the rail, and a magnetic body mounted to the movable section.

A linear scale has a scale element provided on the movable section of the linear motor, and a sensor provided on the base frame. The linear scale is designed to obtain a distance between the scale element and a reference position based on a detection value of the sensor to detect a position of the movable section. Recently, a system has been developed in which a plurality of sensors are arranged over a stroke range greater than a length of a scale element.

For example, a system disclosed in JP 2005-143171A has a plurality of detection elements on a base frame. In order to determine as to which of the detection elements reads the scale element, each of the detection elements is equipped with a flip-flop circuit. A mechanism inputs a trigger signal into the flip-flop circuit corresponding to the detection element which is detecting the scale element, to latch the flip-flop circuit in an enable state. The mechanism then releases latch based on an output of a zero-point signal, thereby counting the read signal while selecting one of the detection elements which is currently reading, and a plurality of position signals output from the detection elements are synthesized together.

The flip-flop circuit in each of the detection elements, and the mechanism (AND gate, differentiation circuit, etc.) for latching the flip-flop circuit, drive up a cost. Meanwhile, it is not easy to accurately synthesize signals detected from whole range of an elongate linear motor to obtain a distance from a reference point of the linear motor, with a low-cost mechanism.

Accordingly, it is an object of the present invention to obtain an accurate distance from a reference point at a low cost.

SUMMARY OF THE INVENTION

The present invention relates to a linear scale for obtaining a distance from a reference point. The linear scale is provided with a scale element having a plurality of magnetic bodies. The scale element is adapted to be read by a scale detection mechanism. The scale detection mechanism is arranged over a stroke range greater than a scale length of the scale element. The scale detection mechanism is adapted to output waveform signals of the same phase and are corresponding to a magnetic flux density generated by the magnetic bodies of the scale element. In a preferred embodiment, the scale detection mechanism may be a plurality of sensors which are adapted to output waveform signals of the same phase along with the movement of the scale element to continuously detect the scale element. In order to achieve this function, the sensors are arranged along a movement direction of the scale element at even intervals corresponding to the scale length. The scale element has opposite ends set to the same polarity. The scale element is configured such that an output voltage of the single sensor detecting the end of the scale element is reduced to one-half of an output voltage of the single sensor detecting the remaining portion of the scale element. It will be understood by those skilled in the art that a waveform signal over a stroke range greater than the scale length can be obtained at a timing of measuring a distance from a reference point by synthesizing a plurality of waveform signals output from the sensors. In the operation, waveform signals of the same phase are output to continuously detect the scale element. This is because adjacent ones of the sensors are evenly spaced apart from each other. The ends of the row of the scale element is set to have the same polarity and the scale element is configured such that an output voltage based on the detection by the single sensor is reduced to one-half of an output voltage of the single sensor detecting the remaining portion of the scale element, so that a waveform signal over the entire stroke range can be formed by simply synthesizing (in an analog manner) waveform signals by the same phase. This makes it possible to obtain a distance from a reference point in a stroke range greater than the length of the scale element, without forming a massive circuit configuration, such as a plurality of flip-flop circuits provided with respect to each sensor.

These and other objects, features and advantages of the invention will become more apparent upon reading the following detailed description along with the accompanying drawings.

BRIEF DESCRIPTION OF THE DRAWINGS

FIG. 3 illustrates a movable section of the linear motor in FIG. 1, wherein

FIG. 7 illustrates a principle of operation of the controller in FIG. 6, wherein

DETAILED DESCRIPTION OF THE PREFERRED EMBODIMENTS OF THE INVENTION

With reference to the accompanying drawings, the present invention will now be described based on a preferred embodiment thereof.

Figure 1:
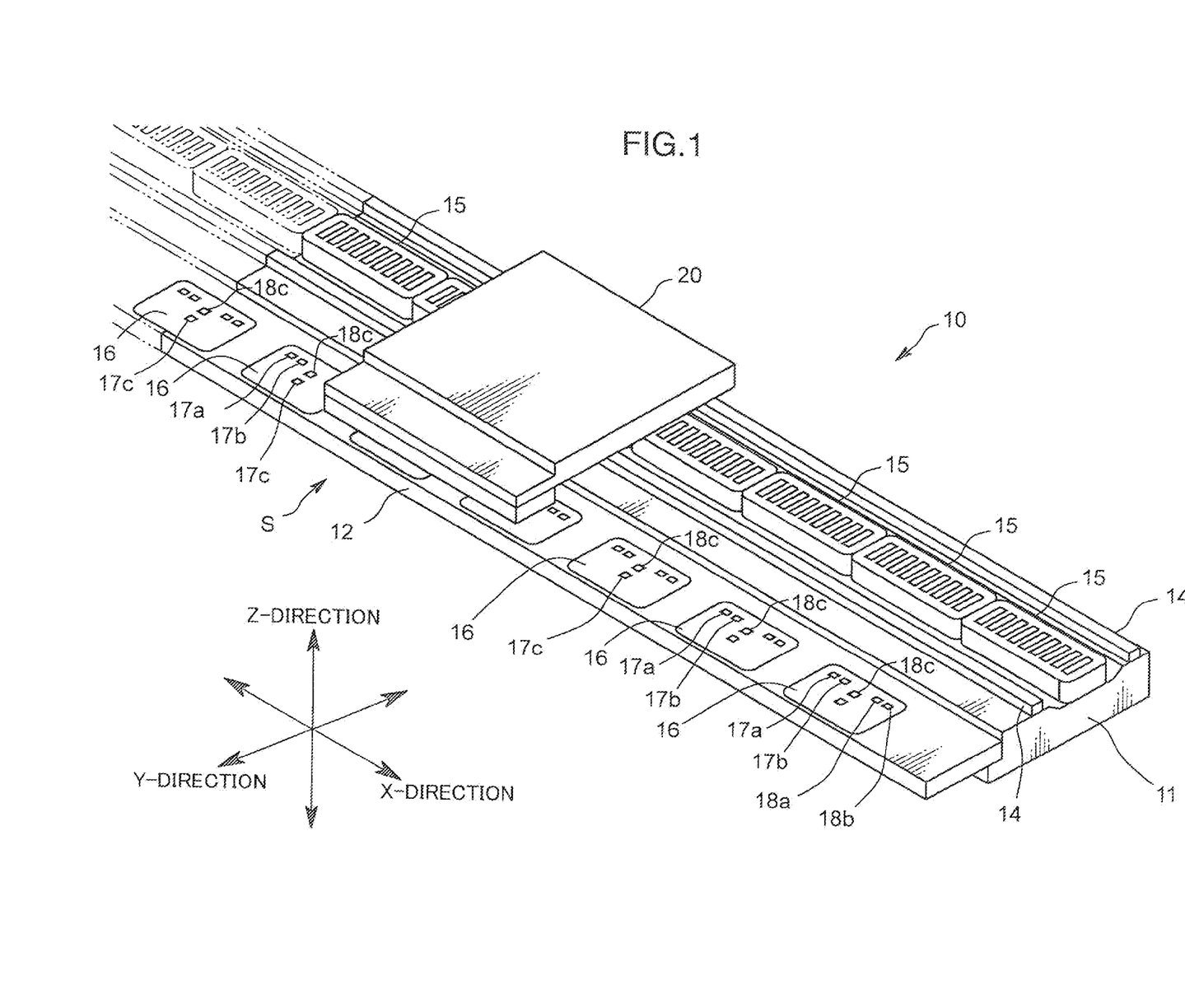
FIG. 1 is a perspective view of a linear motor according to one embodiment of the present invention.

Referring to FIG. 1, a linear scale S is equipped in a linear motor 10. The linear motor 10 may be formed by combining a plurality of modules (a single module is illustrated in FIG. 1) together, as necessary. The module is provided with a base frame 11 belonging to a fixed member. The base frame 11 is a plate-like member having a rectangular shape in top plan view. In the following description, a longitudinal direction and a widthwise (lateral) direction of the base frame 11 will be referred to respectively as "X-direction" and "Y-direction", and a direction perpendicular to both the X and Y-directions will be referred to as "Z-direction", for descriptive purposes.

The base frame 11 has a stepped portion formed along one of long-side thereof to become lowered in the outward of Y-direction. One side of a sensor plate 12 in the Y-direction is seated on the stepped portion. The sensor plate 12 is integrally fixed to the stepped portion while fitting a corner edge thereof onto the stepped portion. A pair of rails 14 are fixed onto the base frame 11 along the X-direction. A plurality of stators 15 are provided between the rails 14 and arranged a continuously along the longitudinal direction of the base frame 11. Each of the stators 15 has a comb-shaped core and a coil wound around the core.

A movable section 20 is coupled onto the rails 14 in a reciprocating manner in the X-direction.

Figure 2:
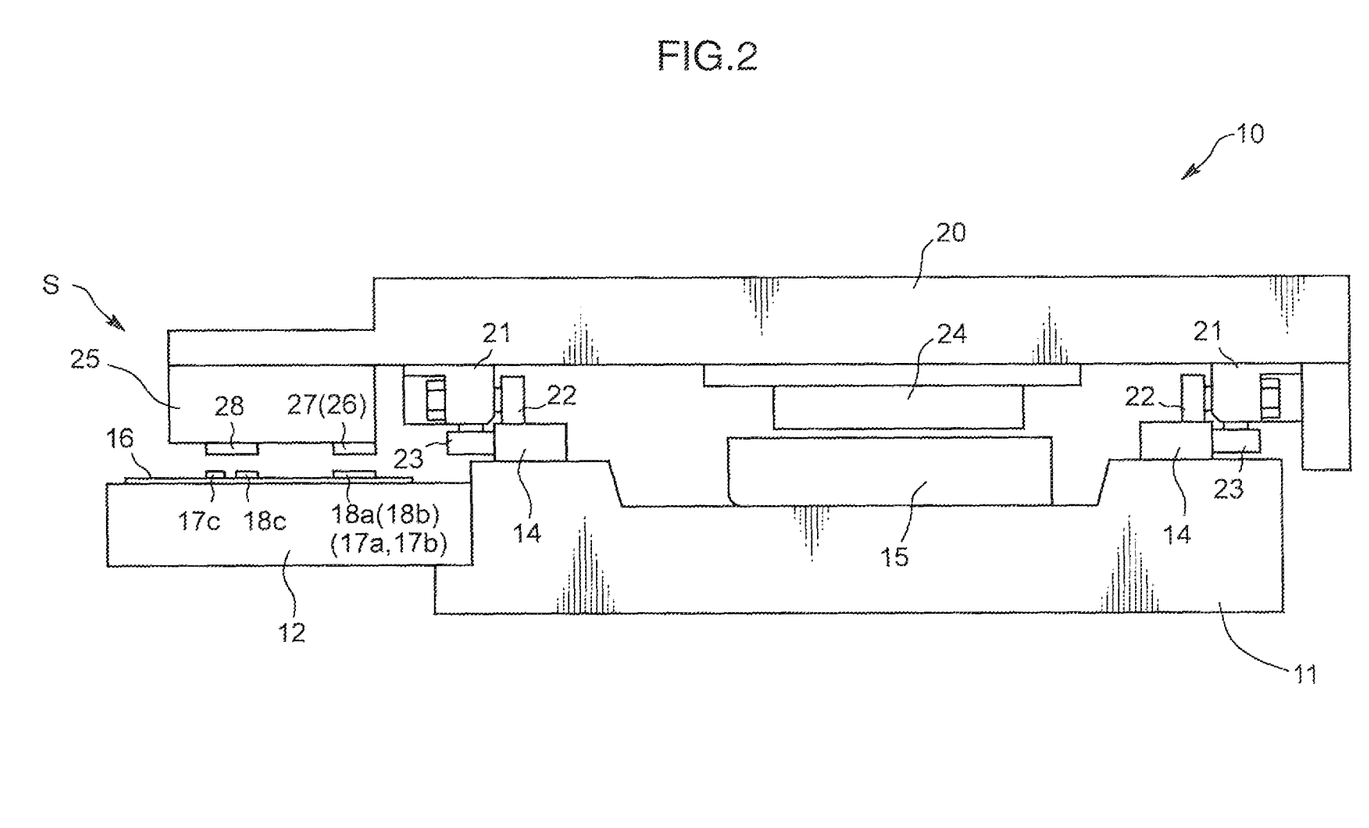
FIG. 2 is a schematic side view of the linear motor in FIG. 1.

As shown in FIG. 2, the movable section 20 has a pair of roller units 21 provided on a bottom surface of the plate-shaped body thereof. The roller units 21 are in correspondence relationship to the respective rails 14. The roller unit 21 is provided with a pair of rollers 22 and 23. The rollers 22 and 23 are, respectively, brought into rolling contact with an upper surface and an outer lateral surface of a corresponding one of the rails 14. The roller unit 21 is coupled to the corresponding rail 14 through the rollers 22 and 23 in a smoothly movable manner.

The movable section 20 has a plurality of permanent magnets 24 fixed to the bottom portion thereof. The permanent magnets 24 are disposed opposed to the stators 15 provided between the rails 14 and arranged continuously. The permanent magnets 24 are arranged in a line at given intervals along the X-direction (in a reciprocating movement direction of the movable section 20), in such a manner that an N-pole and an S-pole appear alternately. Therefore, when one of U-phase, V-phase, and W-phase currents each having a different phase is supplied to the coils of the stators 15 during driving of the linear motor 10, a magnetic flux generated by the coils and a magnetic flux generated by the permanent magnets interact with each other to allow the movable section 20 to reciprocate along the X-direction at a given speed.

The movable section 20 also has a sensor plate 25 fixed to a lateral portion thereof to face an upper surface of the sensor plate 12 of the base frame 11. The sensor plate 25 has a plurality of permanent magnets 26, 27, and 28 attached thereto. The sensor plate 12 of the base frame 11 has a plurality of sensor 17a and 17b, 18a and 18b, 17c, and 18c provided as one example of a scale detection mechanism for measuring a magnetic flux density of each of the permanent magnets 26 and 27. These sensors 17a and 17b, 18a and 18b, 17c, and 18c, and the permanent magnets 26 to 28 serve as primary elements of the linear scale S in this embodiment.

The linear scale S in this embodiment will be more specifically described below.

Figure 3A:
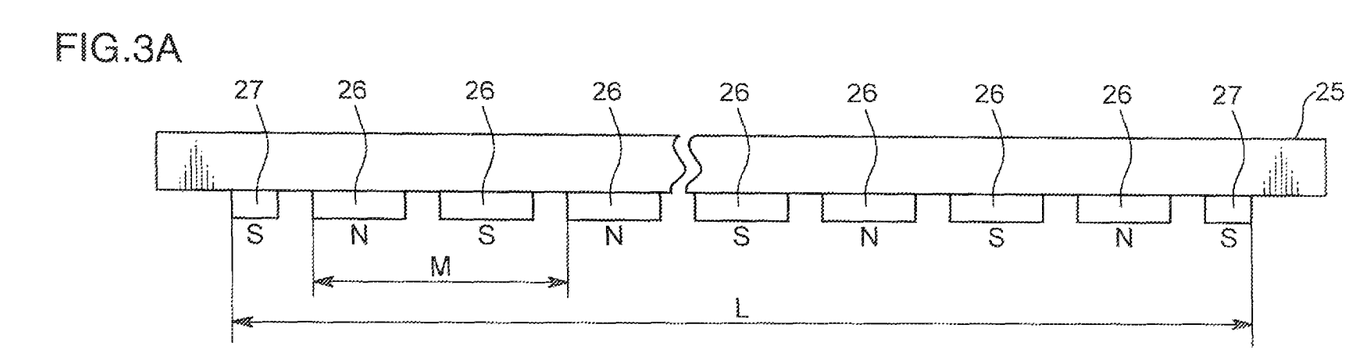
FIG. 3A is a schematic side view.
Figure 3B:
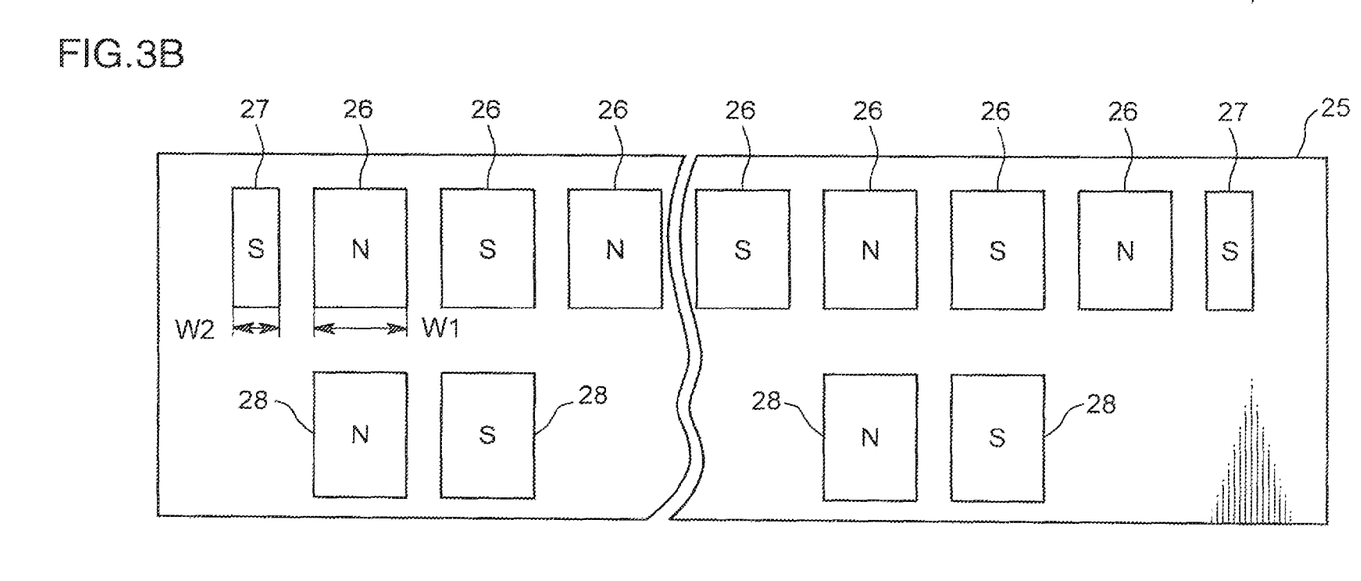
FIG. 3B is a schematic bottom view.

Firstly, referring to FIGS. 3A and 3B, on the sensor plate 25 of the movable section 20, a plurality of rectangular-shaped permanent magnets 26 and two rectangular-shaped permanent magnets 27 form the scale element arranged side-by-side along the X-direction. The permanent magnets 26 and 27 are arranged side-by-side at even intervals within a given scale length L, while alternating polarities. In this embodiment, the number of the permanent magnets 26 is set to allow each permanent magnet 27 disposed on respective opposite ends of the row of the scale element to have the same polarity (S-pole in the illustrated embodiment). Also an X-directional width W2 of each permanent magnet 27 is set to one-half of a width W1 of the remaining permanent magnet 26. As a result of this configuration, a magnetic flux density of each permanent magnet 27 at the ends of row is reduced (to one/half of a magnetic flux density of each permanent magnet 26), as schematically indicated by φ in FIG. 5.

Also, two pairs of permanent magnets 28 are arranged in parallel to the group of permanent magnets 26 and 27. The permanent magnets 28 are attached to the sensor plate 25 along the X-direction at given intervals. The permanent magnets 28 are also arranged in a row while alternating polarities.

Secondly, referring to FIGS. 1 to 4, the sensor plate 12 of the base frame 11 is provided with a plurality of sensor heads 16 which are arranged along the X-direction at even intervals. The number of the sensor heads 16 corresponds to the number of the stators 15 provided on the base frame 11. One of the sensor heads 16 is provided at a boundary between adjacent ones of the stators 15.

Figure 4:
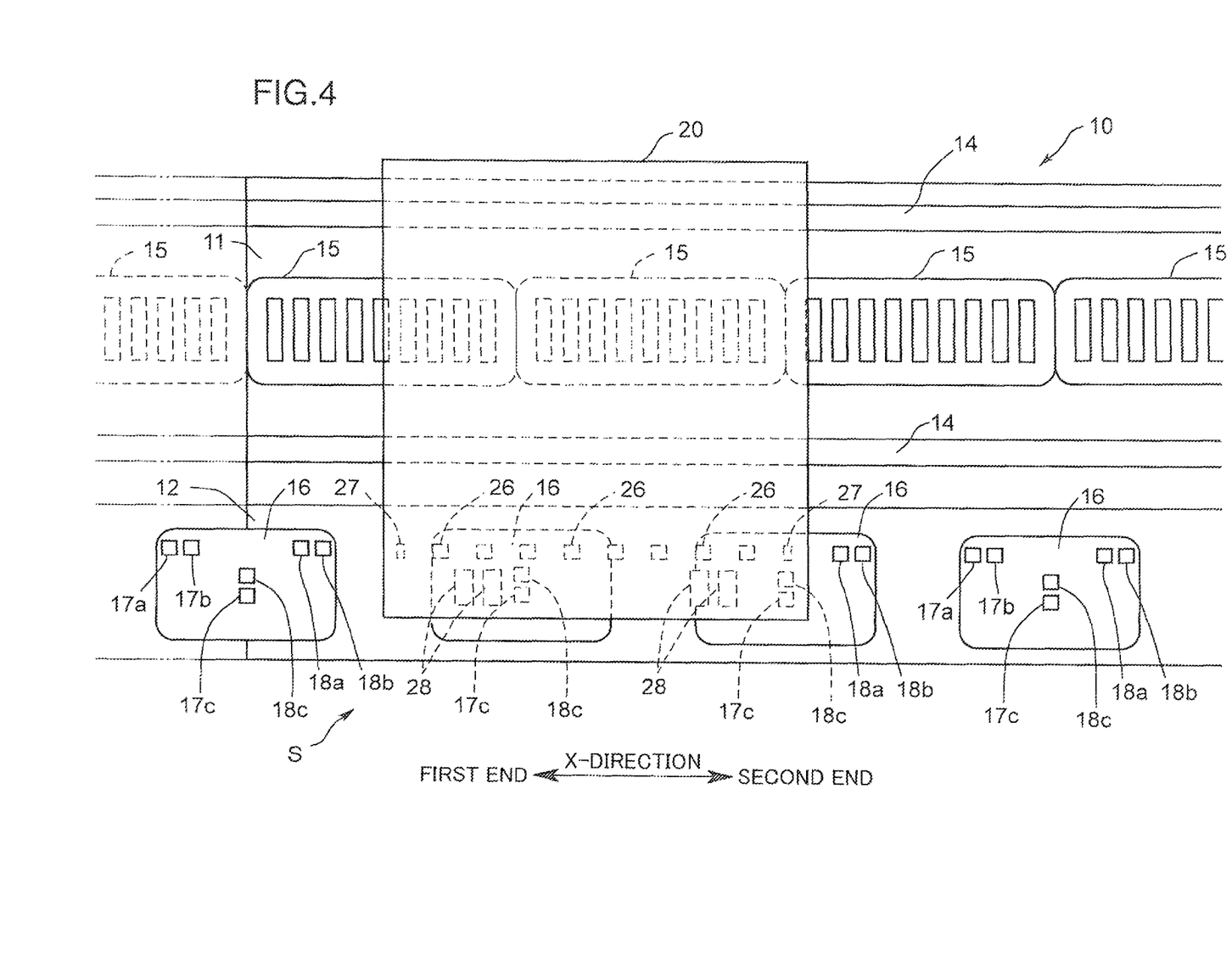
FIG. 4 is a schematic fragmentary enlarged top plan view showing a substantial part of the linear motor in FIG. 1.

Each of the sensor heads 16 has a plurality of sensors. A pair of first sensors 17a and 18a are arranged side-by-side along the X-direction at a position opposed to each of the permanent magnets 26 and 27 in the Z-direction, and adapted to output a sine-wave signal A as an A-phase waveform signal. A pair of second sensors 17b and 18b are arranged side-by-side along the X-direction at a position opposed to each of the permanent magnets 26 and 27 in the Z-direction, and adapted to output a sine-wave signal B as a B-phase waveform signal. A pair of second sensors 17c and 18c are arranged side-by-side along the X-direction at a position opposed to each permanent magnet 28 in the Z-direction, and adapted to output a Z-phase waveform signal. Each of the sensors 17a to 18c may be in the form of a hole sensor, and adapted to measure a magnetic flux density of each of the corresponding ones of the permanent magnets 26 to 28 and output a sine-wave signal as an output voltage (amplitude) corresponding to the magnetic flux density.

In the illustrated embodiment in FIG. 4, the first and second sensors 17a and 17b are arranged left side on the sensor heads 16 while the first and second sensors 18a and 18b are on the right side. Both sets of the sensors 17a and 17b and 18a and 18b are arranged in a left to right order.

Figure 5:
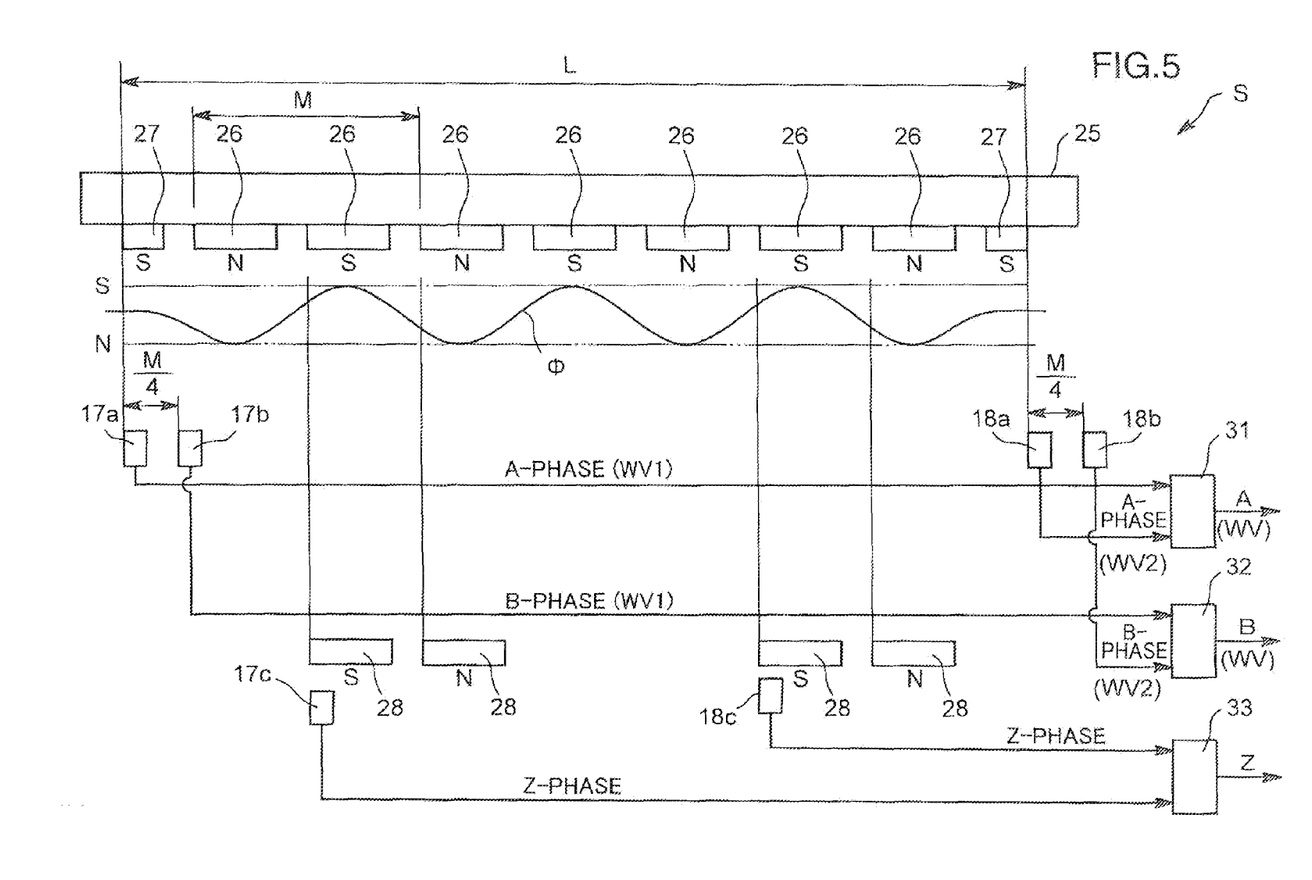
FIG. 5 is a schematic diagram illustrating the linear motor in FIG. 1.

As shown in FIG. 5, comparing with an interval M between the nearest two permanent magnets 26 having the same polarity, an interval between the first sensors 17a and the adjacent second sensor 17b in one pair is set to one-fourth of M(=M/4), so that respective phases of the waveform signals output from the first sensor 17a and the adjacent second sensor 17b are shifted by π/2. As a result, the A- and the B-phases are in a relationship of a sine wave and a cosine wave (see FIG. 7A). These two sine-wave signals A and B are output with the same amplitude and cycle period, except the phase.

Also, an interval between one set of the sensors 17a and 17b on one sensor head 16, and one set of the sensors 18a and 18b on the sensor head 16 right next to the one sensor head 16 is set to allow the sensors 17a and 17b and sensors 18a and 18b to detect continuously a magnetic flux density of each of the permanent magnets 26 and 27 of the movable section in a cooperating manner.

Specifically, intervals between the sensor heads 16 and intervals between the sensors 17a and 18a or 17b and 18b are set to synchronize the sine-wave signals A and B from the first sensors 17a and 18a (or second sensors 17b and 18b). Referring now to FIG. 5, suppose, for example, the movable section 20 moves from left to right. Immediately after the left-side permanent magnet 27 passes through the left-side first sensor 17a (or second sensor 17b) of a certain sensor head 16, the right-side permanent magnet 27 passes through the right-side first sensor 18a (or the second sensor 18b) on the one sensor heads 16. Thus, the sine-wave signals A and B from the first sensors 18a, 17a (or second sensors 18b, 17b) will synchronize with each other. Similarly, in a course of moving the movable section 20 from right to left, when the left-side permanent magnet 27 passes through the left-side first sensor 17a (or second sensor 17b) on the one sensor head 16 immediately after the right-side permanent magnet 27 passes through the right-side first sensor 18a (or second sensor 18b) of the certain sensor head, the sine-wave signals A and B from the first sensors 18a, 17a (or second sensors 18b, 17b) will also synchronize with each other.

As above, two sensor heads 16 form a pair of the first and second sensors 17a and 17b set at one side and a pair of the first and second sensors 18a and 18b set at the other side which enable to detect an accurate relative position between the movable section 20 and one of the stators 15 located between the two sensor heads 16.

The third sensors 17c and 18c are arranged along the Y-direction at a position where the sensor head 16 thereof is in opposed relation to the boundary between adjacent ones of the stators 15 in the Y-direction. In this embodiment, the third sensor 17c located outer-side of one sensor head 16 and the third sensor 18c located inner-side of the sensor head 16 right adjacent to the one sensor head 16 can detect accurately a reference position of one of the stators 15 located between the sensor heads 16.

Figure 6:
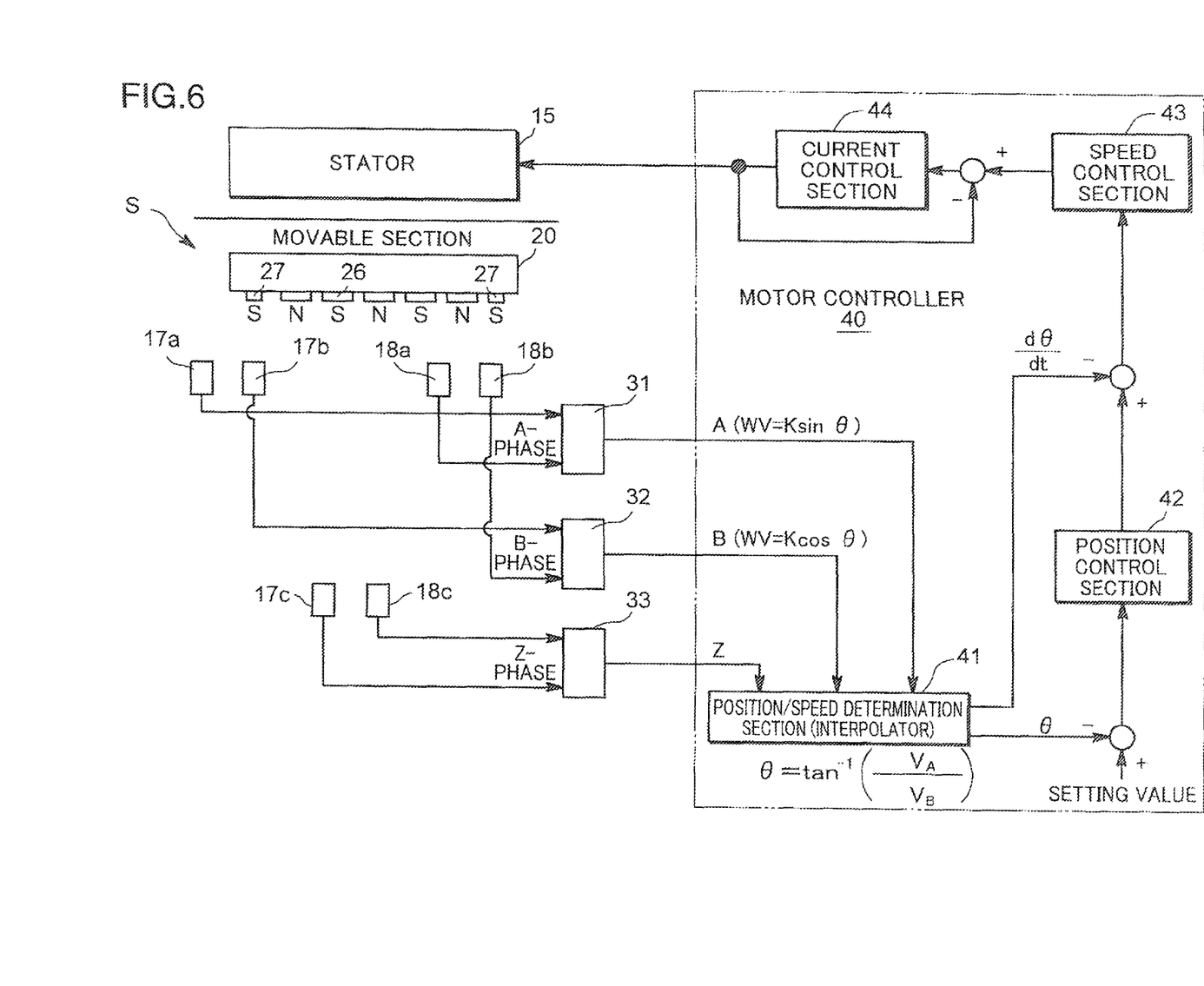
FIG. 6 is block diagram of a system having a controller according to the present invention and the linear motor in FIG. 1 connected thereto.

As shown in FIGS. 5 and 6, respective sine-wave signals A, B, and Z of the sensors 17a to 18c are synthesized by synthesis sections 31, 32, and 33 which are respectively provided for each of phases A, B, and Z to output every phase to a motor controller 40. As for the first and second sensors 17a, 18a, 17b, and 18b, the pair of the left-side sensors 17a and 17b set and the pair of the right-side sensors 18a and 18b set are respectively output WV1 and WV2 which are synthesized as a single synthesized wave WV by phase A, B, or Z (the same applied to the detection in the reverse direction). The synthesis section 31 is operable to output a sine wave (K sin α) having a given amplitude K and a phase angle α as an A-phase sine-wave signal A, while the synthesis section 32 is operable to output a cosine wave (K cos α) having the same amplitude K and phase angle α as those of the sine-wave signal A as a B-phase sine-wave signal B.

Referring to FIG. 6, the motor controller 40 is provided with plurality of sections. A position/speed determination section 41, as a position determination section, is adapted to receive respective outputs A, B, and Z from the synthesis sections 31 to 33. A position control section 42 is adapted to receive an output with respect to an angle θ from the position/speed determination section 41, together with a setting value. A speed control section 43 is adapted to receive an output of the position control section 42 and an output with respect to an angular speed (dθ/dt) from the position/speed determination section 41. A current control section 44 is adapted to receive an output of the speed control section 43. The current control section 44 is operable, based on an input from the speed control section 43, to control a current to be supplied to the drive coils of the stators 15. Based on the motor controller 40, the movable section will be drive-controlled in an arbitrary direction at an arbitrary speed.

Figure 7A:
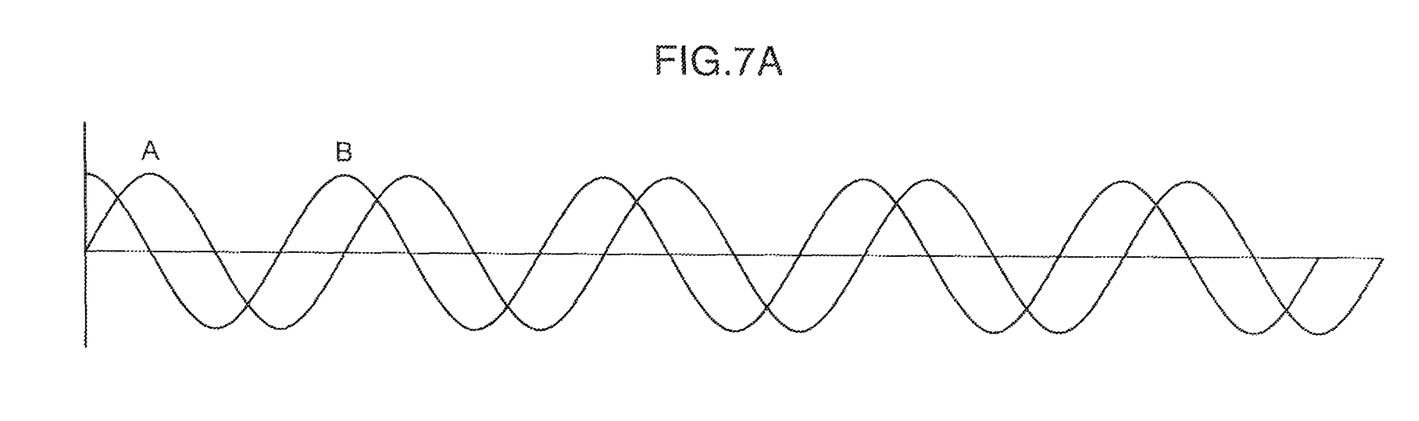
FIG. 7A is a waveform chart of an output signal.

The position/speed determination section 41 of the motor controller 40 may be embodied using an interpolator. The position/speed determination section 41 is operable to obtain a Lissajous curve based on the sine-wave signals A and B from the synthesis sections 31 to 33, as shown in FIG. 7A. Also the position/speed determination section 41 is operable to obtain an angle θ which indicates a relative opposition between the movable section 20 and one of the stators 15 based on the formula (I):

$$\theta = \tan^{-1}\left(\frac{V_A}{V_B}\right) \quad (1)$$

Wherein:
  VA is an output voltage of the first sensor; and
  VB is an output voltage of the second sensor
which is derived from $$\theta = \tan^{-1}\left(\frac{K\sin\theta}{K\cos\theta}\right) \quad (2)$$

Wherein: K is a reference voltage.

Furthermore, based on the Z-phase waveform signals, the position/speed determination section 41 determine a relative position which corresponds to every stator 15 (or the value n of an n-th cycle corresponding to a value θ).

As a prerequisite to synthesizing sine-wave signals A and B and obtain information about a relative position between the movable section 20 and the stator 15 over a stroke range greater than the scale length L, based on the above simple trigonometry calculation, it is necessary that the sine-wave signals A and B illustrated in FIG. 7A are a smooth sine wave or cosine wave. In order to ensure such accuracy, in this embodiment, each permanent magnet 27 at the ends of row, among the permanent magnets 26 and 27 to be subjected to detection of magnetic flux density by the first and second sensors 17a to 18b, is configured such that an X-directional width thereof becomes equal to one-half of that of the remaining permanent magnet 26, as shown in FIG. 3.

Figure 7B:
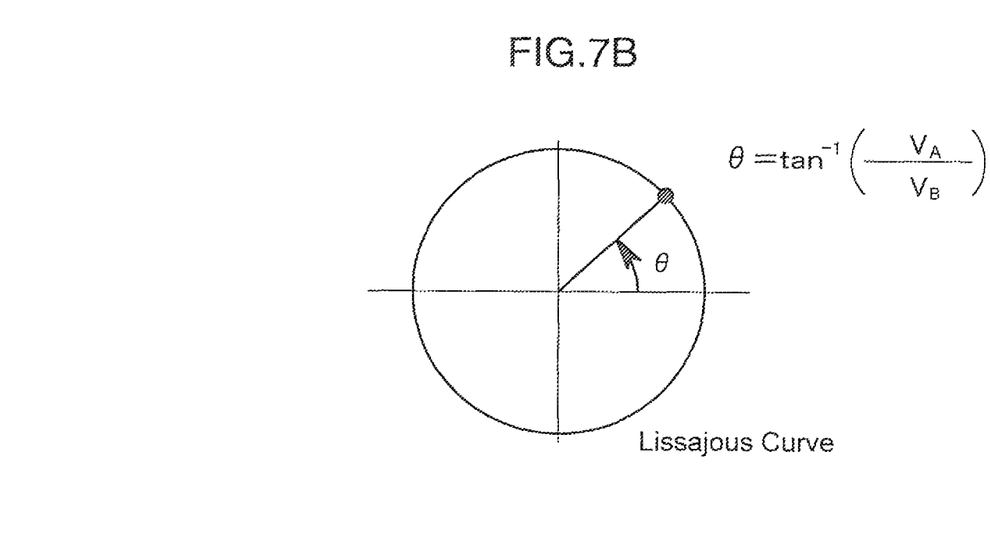
FIG. 7B is a schematic diagram illustrating a Lissajous curve.
Figure 8:
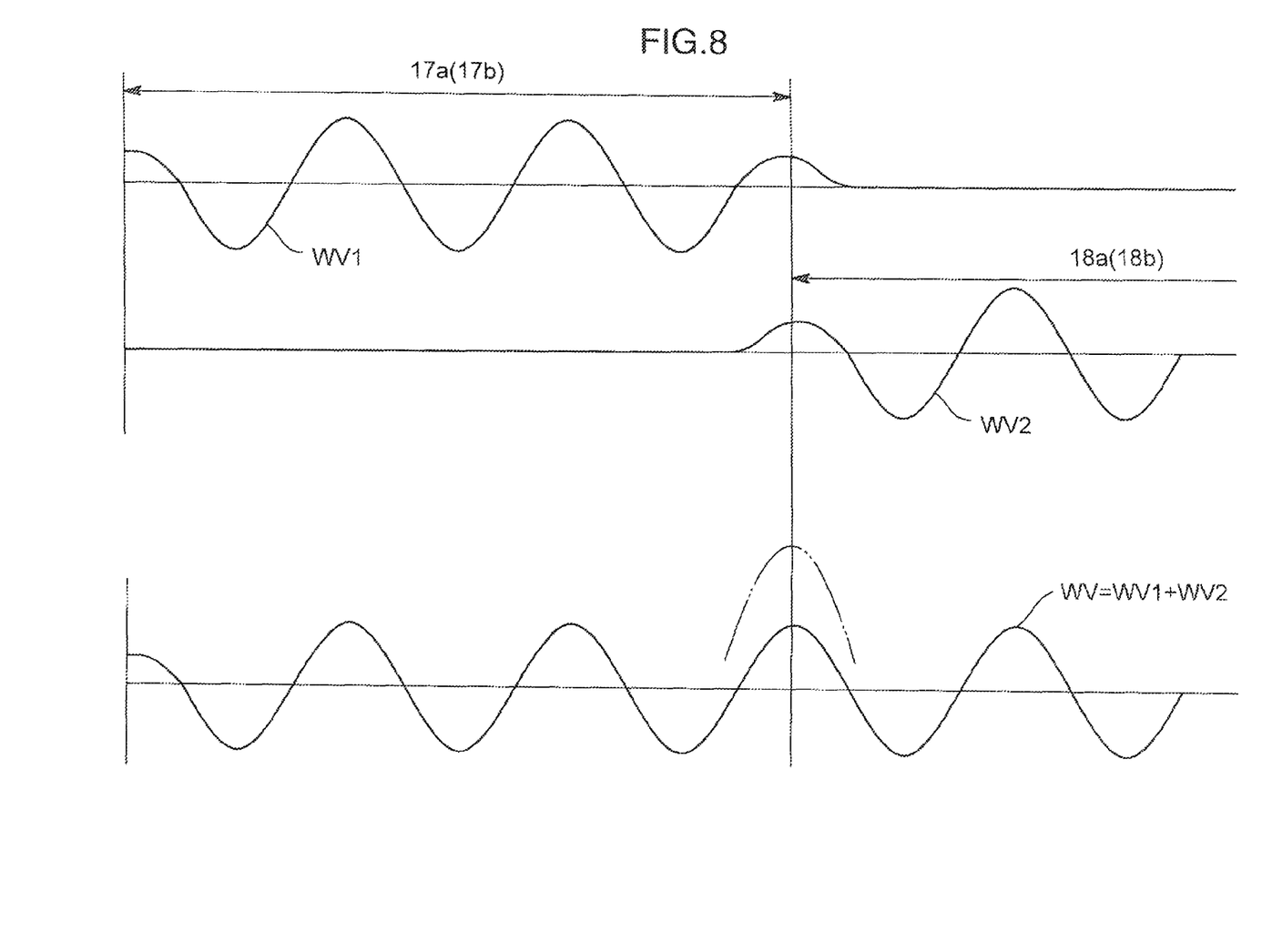
FIG. 8 is a schematic diagram illustrating a principle of operation of the controller in FIG. 6.

Thus, when the sensors 17a (17b) and 18a (18b) are detecting the scale element and the sensors 17a (17b) and 18a (18b) output the WV1 and WV2 as shown in an upper half of FIG. 8, the amplitude of the synthesized portion is the same level as an amplitude in an intermediate portion of the output WV1 (WV2) by each of the sensors 17a and 17b (18a and 18b), as shown in a lower half of FIG. 8. Therefore, it becomes possible to form the Lissajous curve illustrated in FIG. 7B into a perfectly circular shape so as to allow the detection to be accurately performed.

In contrast, if the countermeasures illustrated in FIG. 3 are not taken, when the sensors being detecting the scale element are switched, an amplitude of an synthesized wave WV would be transiently increased as indicated by the two-dot chain line in FIG. 8, so that the Lissajous curve illustrated in FIG. 7B would be in an ellipse to cause inaccurate position detection. This is the reason why it has heretofore been difficult to obtain information about a relative position between the movable section 20 and the stator 15 over a stroke range greater than the scale length L with a simple manner. In this embodiment, the accuracy during synthesizing of waveform signals has been successfully enhanced by setting the permanent magnets 26 and 27 forming the scale element, in such a manner that a magnetic flux density at the ends of row of the scale element is reduced.

As described above, in an operation of obtaining information about a position (distance from a reference point) of the movable section 20, this embodiment enables to obtain a waveform signal over a stroke range greater than the scale length L by synthesizing every waveform signal from the first and second sensors 17a and 18a, 17b and 18b by A-phase or B-phase. In this case, the sensors 17a and 18a (17b and 18b) adapted to output waveform signals of the same phase are evenly spaced apart from each other so that the sensors 17a and 18a (17b and 18b) can continuously detect the permanent magnets 26 and 27 in such a manner that one end of the row of the permanent magnets 26 and 27 as the scale element are detected immediately after the other end of the row of the permanent magnets 26 and 27 are detected. In addition, each permanent magnet 27 at the ends of row is set to have the same polarity, and configured such that an output voltage of the single sensor detecting the end of the scale element is reduced to one-half of an output voltage of the single sensor detecting the remaining portion of the scale element. Thus, waveform signals of the same phase can be synthesized in an analog manner, to form a waveform signal over the entire stroke range. This makes it possible to obtain precise information about a position of the movable section 20 without forming a massive circuit configuration, such as a plurality of flip-flop circuits provided with respect to each sensor.

In this embodiment, the scale element includes the group of permanent magnets 26 and 27 arranged in a row while alternating polarities, and an X-directional width W2 of each permanent magnet 27 disposed at the ends of the row is set to one-half of a width W1 of the remaining permanent magnet 26. Therefore, in this embodiment, a magnetic flux density of each permanent magnet 27 at the ends of row can be reduced to one-half, which makes it possible to synthesize smooth sine waveforms from every sine-wave signal A and every sine-wave signal B detected by the sensors 17a to 18b.

Thus, this embodiment provides a significant advantageous effect of being able to accurately obtain a distance from a reference point at a low cost.

The above embodiment has been shown and described just as a preferred specific example of the present invention, and the present invention is not limited to the above embodiments.

Figure 9:
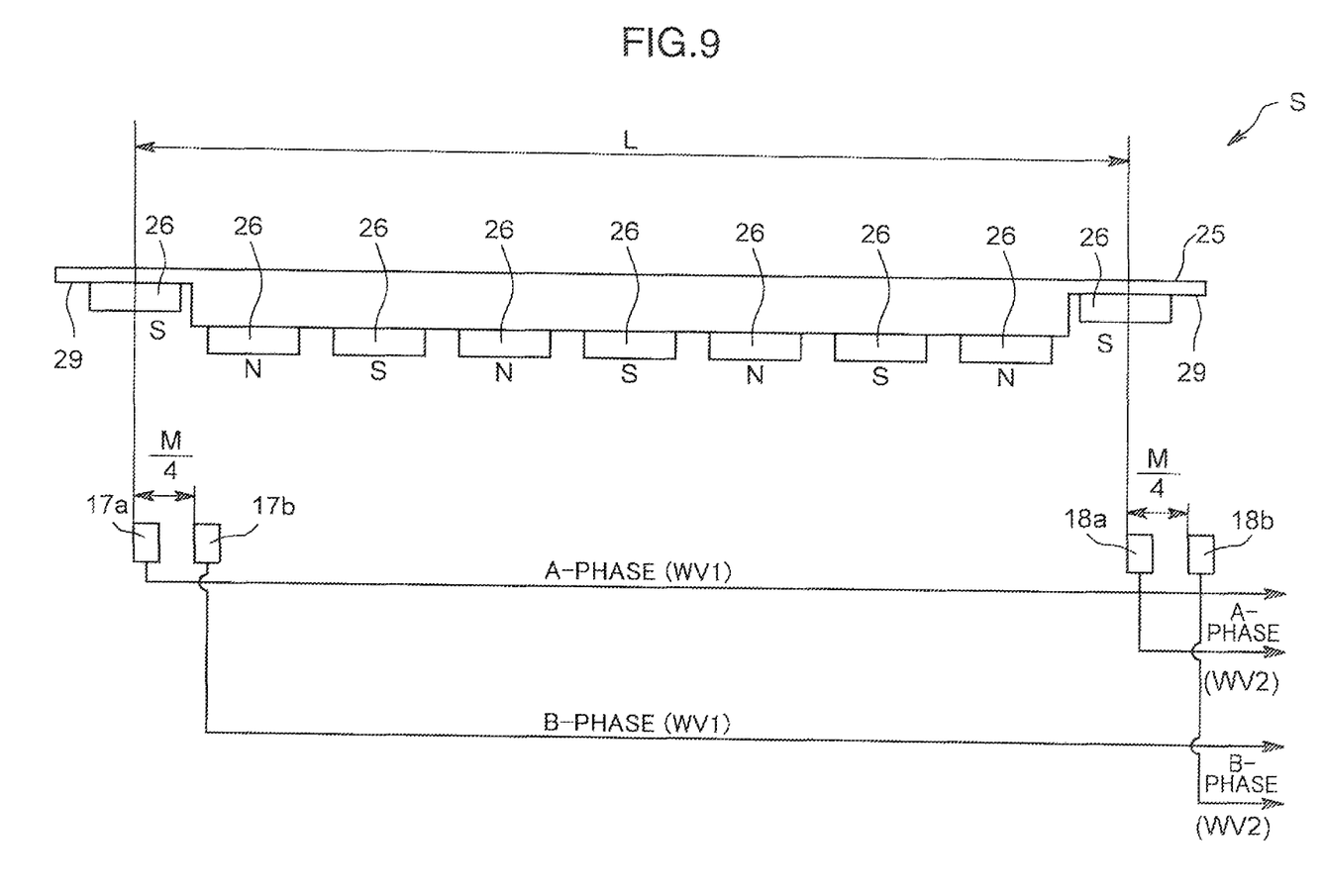
FIG. 9 is a schematic diagram illustrating a linear motor according to another embodiment of the present invention.

In another embodiment illustrated in FIG. 9, the scale element includes a group of permanent magnets 26 arranged in a row while alternating polarities, and each permanent magnet disposed at the ends of row is received in recess portions 29 formed in the movable section 20. Thus, each permanent magnet 26 disposed at the ends of the row has a surface located to face each of the first and second sensors 17a to 18b and farther away in the Z-direction from the sensor than a surface of the remaining permanent magnet 26 opposed to the sensor, so that a magnetic flux density of each permanent magnet 26 at the ends of the row can be reduced (to one-half of a magnetic flux density of the remaining permanent magnet 26).

Figure 10:
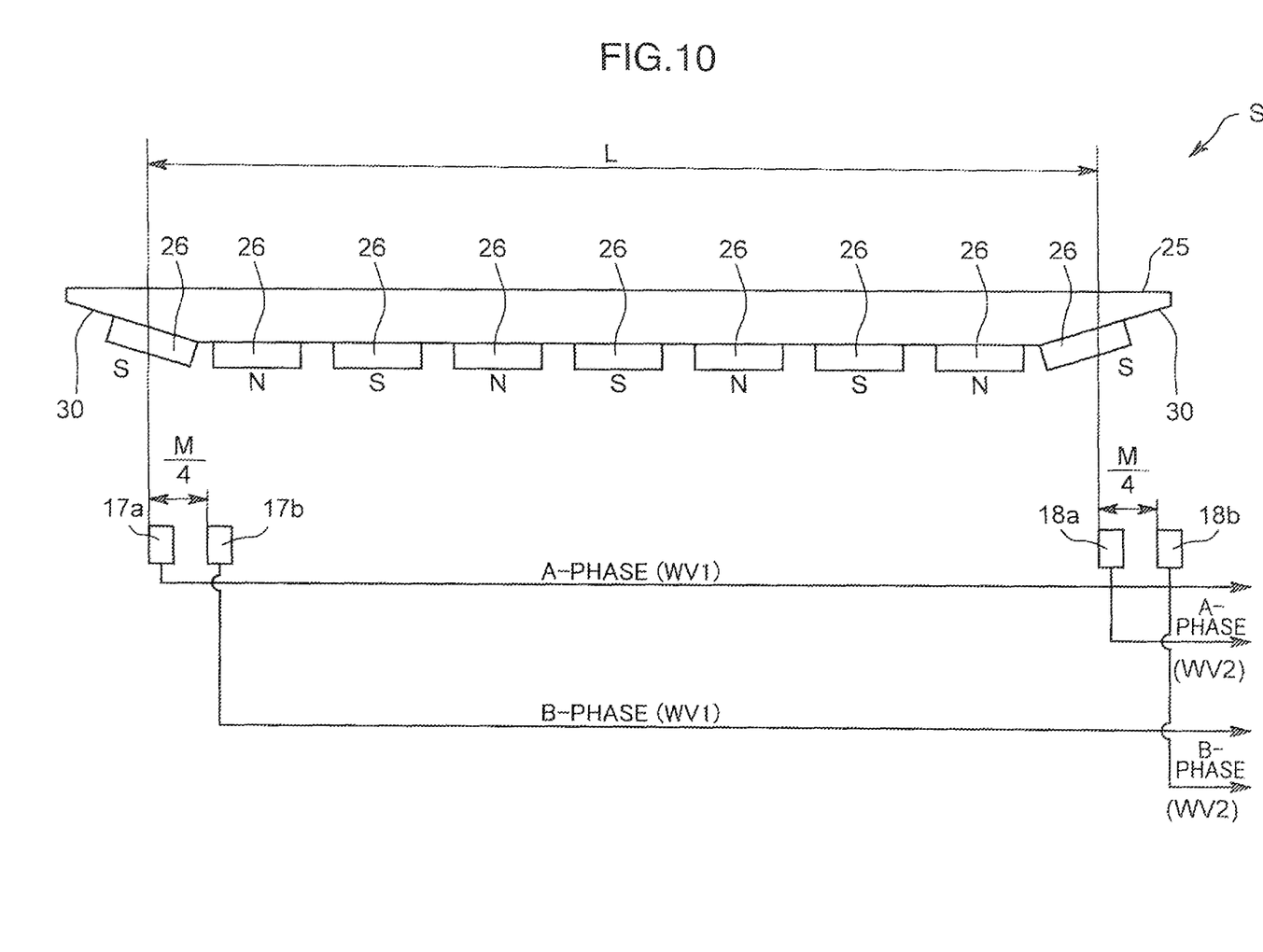
FIG. 10 is a schematic diagram illustrating a linear motor according to yet another embodiment of the present invention.

In yet another embodiment illustrated in FIG. 10, the scale element includes a group of permanent magnets 26 arranged in a row while alternating polarities, and each permanent magnet 26 disposed at the ends of row is fixed on an inclined surface 30 formed on the movable section 20. The illustrated inclined surface 30 is inclined away from each of the sensors 17a to 18b in an outward direction along an arrangement direction of the permanent magnets 26, so that a magnetic flux density of each permanent magnet 26 at the ends of the row can be reduced (to one-half of a magnetic flux density of the remaining permanent magnet 26).

In the embodiments illustrated in FIGS. 9 and 10, the scale element can be formed using a plurality of permanent magnets each having the same configuration, which makes it possible to facilitate control and maintenance of components and thus a reduction in product cost.

As mentioned above, according to a preferred aspect of the present invention, there is provided a linear scale for obtaining a distance from a reference point. The linear scale is provided with a scale element having a plurality of magnetic bodies; and a scale detection mechanism arranged over a stroke range greater than a scale length of the scale element. The mechanism is adapted to output waveform signals of the same phase and is corresponding to a magnetic flux density generated by the magnetic bodies of the scale element. The scale detection mechanism is a plurality of sensors arranged in a movement direction of the scale element at even intervals corresponding to the scale length and adapted to output waveform signals of the same phase in response to a movement of the scale element to continuously detect the scale element. The scale element has opposite ends each has the same polarity and configured such that an output voltage of the single sensor detecting the end of the scale element is reduced to one-half of an output voltage of the single sensor detecting the remaining portion of the scale element. In the linear scale according to this aspect, in an operation of obtaining a distance from a reference point, waveform signals output from the plurality of sensors forming the scale detection mechanism can be synthesized to obtain a waveform signal over a stroke range greater than the scale length. In this case, the sensors are evenly spaced apart from each other to allow the sensors to output waveform signals of the same phase to continuously detect the scale. In addition, each permanent magnet at the ends of row is set to have the same polarity, and configured such that an output voltage of the single sensor detecting the end of the scale element is reduced to one-half of an output voltage of the single sensor detecting the remaining portion of the scale element. Thus, waveform signals of the same phase can be synthesized in an analog manner, to form a waveform signal over the entire stroke range. This makes it possible to drive a distance from a reference point over a stroke range greater than the scale length, without forming a massive circuit configuration, such as a plurality of flip-flop circuits provided with respect to each sensor.

In a preferred embodiment, the scale element includes a group of permanent magnets arranged in a row while alternating polarities, wherein each permanent magnet, disposed at the ends of the row, has a width along the movement direction which is set to one-half of a width of the remaining permanent magnet along the movement direction. In this embodiment, a magnetic flux density of each permanent magnet at the ends of row can be reduced to one-half, which makes it possible to obtain a smooth sine waveform when waveform signals detected by the sensors 17a to 18b are synthesized.

In another preferred embodiment, the scale element includes a group of permanent magnets arranged in a row while alternating polarities, and wherein each permanent magnet, disposed at the ends of the row, has a surface located to face the sensors and farther away from the sensor than a surface of the remaining permanent magnet opposed to the sensor. In the embodiments, the scale can be formed using a plurality of permanent magnets each having the same configuration, which makes it possible to facilitate control and maintenance of components and thus a reduction in product cost.

In yet another preferred embodiment, the scale element includes a group of permanent magnets arranged in a row while alternating polarities, wherein each permanent magnet, disposed at the ends of the row, has a surface located to face the sensors and inclined gradually away from the sensor in an outward direction along an arrangement direction of the permanent magnets. In the embodiments, the scale can also be formed using a plurality of permanent magnets each having the same configuration, which makes it possible to facilitate control and maintenance of components and thus a reduction in product cost.

According to another aspect of the present invention, there is provided a linear motor comprising the above a linear scale, a movable section supporting the scale element, and a base frame supporting the movable section in a reciprocating manner, wherein the sensors consist of a plurality of pairs of a first sensor adapted to output a given waveform signal, and a second sensor adapted to output the same waveform signal, except that a phase is shifted relative to that of the given waveform signal by $\pi/2$.

According to yet another aspect of the present invention, there is provided a linear motor controller for controlling a linear motor. The linear motor controller comprises a position determination section operable, based on an output of the waveform signal from each of the first sensors and an output of the waveform signal from a corresponding one of the second sensors, to calculate a position angle of the movable section to determine a position of the scale element from the reference point.

This application is based on Japanese Patent Application Serial No. 2009-256042, filed in Japan Patent Office on Nov. 9, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A linear scale for obtaining a distance from a reference point, comprising:
   a scale element having a plurality of magnetic bodies;
   a scale detection mechanism arranged over a stroke range greater than a scale length of the scale element, the mechanism is adapted to output waveform signals corresponding to a magnetic flux density generated by the magnetic bodies of the scale element; and
   a plurality of sensors, the sensors constitute the scale detection mechanism, are arranged in a movement direction of the scale element at even intervals corresponding to the scale length, and the sensors are adapted to output waveform signals of the same phase in response to a movement of the scale element to continuously detect the scale element,
   wherein the scale element has opposite ends each has the same polarity, and the scale element is configured such that an output voltage of the single sensor detecting the end of the scale element is reduced to one-half of an output voltage of the single sensor detecting the remaining portion of the scale element.

2. The linear scale as defined in claim 1, wherein the scale element includes a group of permanent magnets arranged in a row while alternating polarities, and wherein each permanent magnet, disposed at the ends of the row, has a width along the movement direction which is set to one-half of a width of the remaining permanent magnet along the movement direction.

3. The linear scale as defined in claim 1, wherein the scale element includes a group of permanent magnets arranged in a row while alternating polarities, and wherein each permanent magnet, disposed at the ends of the row, has a surface located to face the sensors and farther away from the sensor than a surface of the remaining permanent magnet opposed to the sensor.

4. The linear sensor as defined in claim 1, wherein the scale element includes a group of permanent magnets arranged in a row while alternating polarities, and wherein each permanent magnet, disposed at the ends of the row, has a surface located to face the sensors and inclined gradually away from the sensor in an outward direction along an arrangement direction of the permanent magnets.

5. A linear motor equipped with a linear scale for obtaining a distance from a reference point, comprising:
   the linear scale includes a scale element having a plurality of magnetic bodies, and a scale detection mechanism arranged over a stroke range greater than a scale length of the scale element, the mechanism is adapted to output waveform signals corresponding to a magnetic flux density generated by the magnetic bodies of the scale element, and a plurality of sensors, the sensors constitute the scale detection mechanism, are arranged in a movement direction of the scale element at even intervals corresponding to the scale length, the sensors are adapted to output waveform signals of the same phase in response to a movement of the scale element to continuously detect the scale element;
   a movable section supporting the scale element; and
   a base frame supporting the movable section in a reciprocating manner,
   wherein the scale element has opposite ends each has the same polarity, and the scale element is configured such that an output voltage of the single sensor detecting the end of the scale element is reduced to one-half of an output voltage of the single sensor detecting the remaining portion of the scale element, and
   wherein the sensors includes a plurality of first sensors adapted to output a given waveform signal, and a plurality of second sensors adapted to output the same waveform signal except that the phase is shifted relative to that of the given waveform signal by $\pi/2$.

6. A linear motor controller for controlling a linear motor, the linear motor comprises:
   a linear scale includes a scale element having a plurality of magnetic bodies, and a scale detection mechanism arranged over a stroke range greater than a scale length of the scale element, the mechanism is adapted to output waveform signals corresponding to a magnetic flux density generated by the magnetic bodies of the scale element, and a plurality of sensors, the sensors constitute the scale detection mechanism, are arranged in a movement direction of the scale element at even intervals corresponding to the scale length, the sensors are adapted to output waveform signals of the same phase in response to a movement of the scale element to continuously detect the scale element;
   a movable section supporting the scale element; and
   a base frame supporting the movable section in a reciprocating manner,
   wherein the scale element has opposite ends each has the same polarity, and the scale element is configured such that an output voltage of the single sensor detecting the end of the scale element is reduced to one-half of an output voltage of the single sensor detecting the remaining portion of the scale element, and
   wherein the sensors includes a plurality of first sensors adapted to output a given waveform signal, and a plurality of second sensors adapted to output the same waveform signal except that the phase is shifted relative to that of the given waveform signal by $\pi/2$, the linear motor controller including a position determination section which is, based on an output of the waveform signal from each of the first sensors and an output of the waveform signal from a corresponding one of the second sensors, operable to calculate a position angle of the movable section to determine a position of the scale element from the reference point.

\* \* \* \* \*